(12) United States Patent
Tüllmann et al.

(10) Patent No.: US 9,233,442 B2
(45) Date of Patent: Jan. 12, 2016

(54) GUIDING SYSTEM FOR MACHINE TOOLS THAT IS HELD BY MEANS OF COOLING BARS

(75) Inventors: Udo Tüllmann, Eisanach (DE); Fabian Suckert, Erfurt (DE); Jens Ebert, Barchfeld (DE)

(73) Assignee: DECKEL MAHO SEEBACH GMBH, Seebach (DE)

( * ) Notice: Subject to any disclaimer, the term of this patent is extended or adjusted under 35 U.S.C. 154(b) by 102 days.

(21) Appl. No.: 13/994,669

(22) PCT Filed: Dec. 14, 2011

(86) PCT No.: PCT/EP2011/072689
§ 371 (c)(1),
(2), (4) Date: May 28, 2014

(87) PCT Pub. No.: WO2012/080295
PCT Pub. Date: Jun. 21, 2012

(65) Prior Publication Data
US 2014/0270600 A1   Sep. 18, 2014

(30) Foreign Application Priority Data
Dec. 15, 2010   (DE) .................... 20 2010 016 616 U

(51) Int. Cl.
| F16C 17/24 | (2006.01) |
| F16C 33/10 | (2006.01) |
| B23Q 1/01 | (2006.01) |
| B23Q 11/12 | (2006.01) |
| B23Q 11/14 | (2006.01) |
| F16C 29/00 | (2006.01) |
| F16C 37/00 | (2006.01) |

(52) U.S. Cl.
CPC .............. *B23Q 1/017* (2013.01); *B23Q 11/128* (2013.01); *B23Q 11/14* (2013.01); *B23Q 11/141* (2013.01); *F16C 29/004* (2013.01); *F16C 29/005* (2013.01); *F16C 37/00* (2013.01)

(58) Field of Classification Search
CPC .. B23Q 11/126; B23Q 11/128; F16C 29/005; F16C 29/008
USPC .................................. 384/7, 9, 15, 26, 45, 13
See application file for complete search history.

(56) References Cited

U.S. PATENT DOCUMENTS

| 5,431,497 A | 7/1995 | Nonaka |
| 7,866,887 B2 | 1/2011 | Röders |
| 2007/0137333 A1 | 6/2007 | Geissler |

FOREIGN PATENT DOCUMENTS

| FR | 1238130 A | 8/1960 |
| JP | 2002266977 A | 9/2002 |
| WO | WO 2005077597 A1 * | 8/2005 |
| WO | WO 2009031672 A1 * | 3/2009 |

OTHER PUBLICATIONS

International Search Report (PCT/EP2011/072689) dated Feb. 13, 2012 (4 pages, including an English translation of p. 2).

* cited by examiner

*Primary Examiner* — Phillip A Johnson
(74) *Attorney, Agent, or Firm* — The Maxham Firm

(57) ABSTRACT

A guiding system for machine tools of the type having first machine parts with guiding rails fastened thereto and second machine parts supported by shoes on the guiding rails of the first machine parts in such a way that they can be moved with respect to each other. At least in sections along their length that are exposed to high thermal loading, the guiding rails are kept in close pressure contact over a large surface area by cooling bars to which a coolant is applied.

20 Claims, 3 Drawing Sheets

GUIDING SYSTEM FOR MACHINE TOOLS THAT IS HELD BY MEANS OF COOLING BARS

FIELD OF INVENTION

The invention relates generally to guiding systems for machine tools, and more particularly to such a guiding system having first machine parts with guiding rails fastened thereto and with clamping bars for fixing the guiding rails in and/or at the respective machine part and where second machine parts are supported by means of shoes on the guiding rails of the first machine parts in such a way that they can be moved in motorized manner.

BACKGROUND OF THE INVENTION

In order to improve the running times and non-productive times, the axis speeds and the axis accelerations of the machine parts of machine tools are constantly increased. This results in major frictional losses in driving and guiding elements and in an increased heating of certain machine areas. In order to reduce these problems, encapsulated and cooled drive motors for the respectively moving machine parts have been used. The thermal encapsulation of the drive motors can lead to the fact that in particular in the case of highly dynamic machines more heat is introduced into the machine structure by friction in the linear guides rather than by the drives as such. The heat is introduced into the slides via the guiding shoes at a defined location and, if necessary, can be measured by a fixedly attached temperature sensor and therefore the effects of the heat input on the machine can be linearly compensated. On the other hand, the heat input into the machine structure takes place via the guiding rails in a way as a "line load," this thermal line load, that is, also the local distribution of the heat input in the respective machine part over the driven distance, depending on a number of parameters and on the NC program. Since the heat input changes with the location, it is no longer possible to detect and analyze it with stationary temperature sensors. This applies in particular to the cases in which only short machining is carried out with small lifting distances in rapid sequence on one or more workpieces. The disadvantageous result is heating and thus thermal deformations of the guiding rails, said deformations impairing the machining accuracy and reducing the life-time of the guiding systems due to increased wear.

According to patent publications EP 1 785 225 A and JP 2002 266977, the prior art includes spindle drives for machine tool components that have internal cooling for lowering the temperature of the spindle over its entire effective length and for avoiding heat concentrations in particularly stressed lengthwise sections. For the purpose of cooling, two longitudinal channels are formed in the spindle interior, those channels being connected to each other at one end and being provided with connections for supplying and discharging cooling liquid at the other end thereof. Due to the rotation of the spindle it is necessary to use multi-sealed rotating connections for the pressurized cooling liquid, which requires a technical input along with relatively high costs. There are no effects on the thermal behavior of the guiding system of the machine parts moved by the linear drives.

German patent DE 10 2005 029 854 B4 discloses a guiding rail for a linear guiding system which is designed for being used in machine tools. The respective guiding rail has internal cooling by means of a cooling liquid. Instead of having an inner longitudinal bore to be produced with technical input, a longitudinal groove is formed in the bottom of this known guiding rail, the groove being filled with cooling liquid. However, the leakages of the cooling liquid, occurring in the long-term operation when the mechanical and/or thermal loads are high, are problematic.

SUMMARY OF EMBODIMENTS OF THE INVENTION

A purpose of embodiments of the invention is to provide a guiding system for machine tools, which prevents significant quantities of heat from being introduced into the machine structure via the guiding rails.

This purpose can be achieved by the embodiments disclosed here. In the inventive use of cooling bars which are arranged in close pressure contact over a large surface area at the guiding rails and, where appropriate, also at the thermally stressed areas of the machine parts, relatively great quantities of heat are transferred from the guiding rails and the adjacent areas of the machine parts into the cooling bars and/or into the cooling liquid or coolant flowing through the bars. This heat transfer is due to the high thermal conductivity and serves to avoid relatively high temperatures of the guiding rails and, in particular, temperature increases in certain areas of the guiding rails.

According to a useful embodiment of the invention, each of the cooling bars has at least one longitudinal channel including an intake connection and a drain connection for the cooling liquid. This longitudinal channel extends over the entire length of the cooling bar and ensures a continuous effective cooling effect of the adjacent guiding rail. Two longitudinal channels are each appropriately provided in the lateral areas of the respective cooling bar, and therefore elements for attaching the cooling bar to the machine part can be arranged in the central area thereof. The two parallel longitudinal channels are appropriately connected with each other at one end of the cooling bar so as to yield forward and return flows of the cooling liquid, the intake and drain connections being jointly arranged at the other end of the respective cooling bar.

The cooling bars fulfill a dual function, namely the effective cooling of the guiding rails, on the one hand, and additionally also the fixed and permanent positional fixation of the guiding rails in and/or at the respective machine part. To this end, the cooling bars are held in direct pressure contact at the base part of the guiding rail by appropriate means such as wedge-type clamping or by clamp screw. The heat dissipation from the base part into the respective cooling bar results in a lower temperature in the head area of the guiding rail.

In order to achieve the aspired effectiveness, the cooling bars are made as continuous casting profiles from a highly heat-conductive material, preferably from a light metal such as aluminum, or alloys thereof, or both.

BRIEF DESCRIPTION OF THE DRAWING

The objects, advantages, and features of the embodiments of the invention will be more clearly perceived from the following detailed description, when read in conjunction with the accompanying drawing, in which.

DETAILED DESCRIPTION OF EMBODIMENTS OF THE INVENTION

Figure 1B:
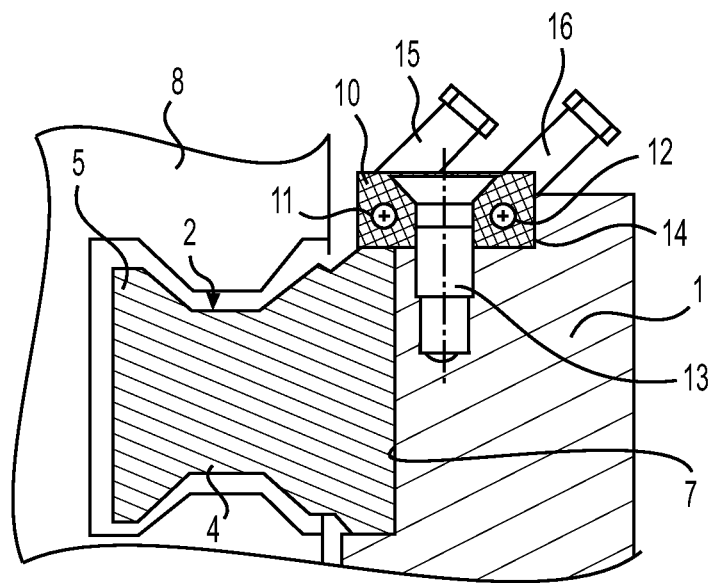
FIG. 1B is a cross-sectional view of the embodiment of FIG. 1A.
Figure 2A:
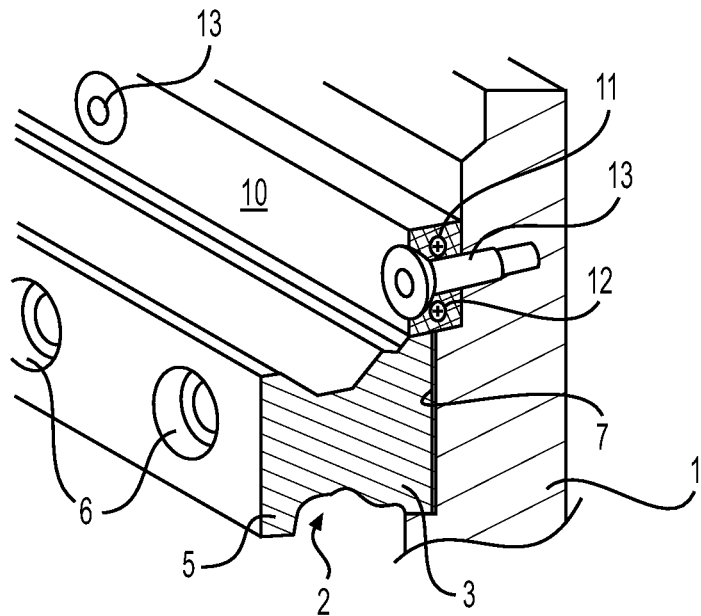
FIG. 2A shows a further embodiment of the guiding system according to the invention in a partially cut perspective view.
Figure 3A:
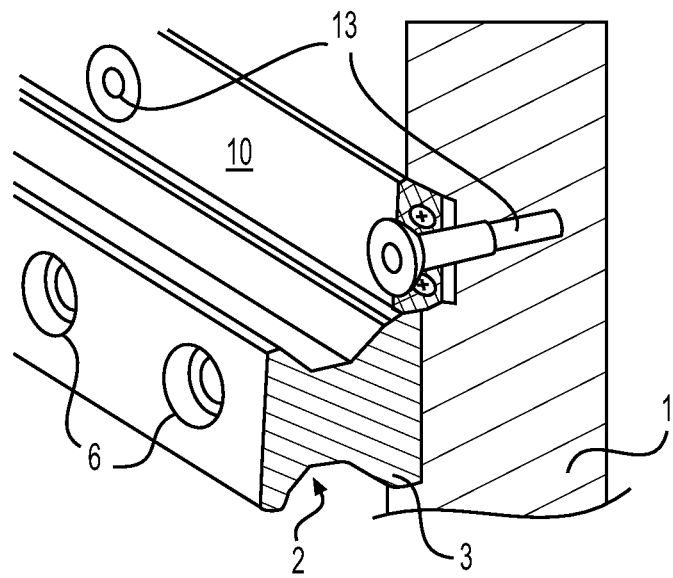
FIG. 3A shows another embodiment of the guiding system according to the invention in a partially cut perspective view.

A machine tool has a plurality of machine parts, and in the segments shown there is first machine part 1, which can be a slide, part of the machine column, or the machine bed. Profiled guiding rail 2 is attached to machine part 1 as shown in the drawing. A second machine part is guided along the rail by means of guiding shoes 8, only one of which is shown schematically in FIG. 1B. As shown, each guiding rail 2 has widened base 3, narrower central part 4 and, again, a widened head or base area 5. The guiding rail is attached to machine part 1 by countersunk screws 6 (shown in FIGS. 2A and 3A) spaced apart from one another in the longitudinal direction. In order to secure guiding rail 2, machine part 1 has a flat, longitudinally continuous countersink 7 into which widened base 3 of the guiding rail is fitted. The countersink has a plane basal area where the bottom area of the guiding rail abuts in close pressure contact.

The respective guiding rail 2 is laterally supported and locked by clamping and cooling bar 10 which is rectangular in cross-section, the two lateral areas of which each has a longitudinal channel 11, 12. Cooling bar 10 is attached in a longitudinally extending support 14 in machine part 1 by clamp screws 13 spaced apart from one another in the longitudinal direction. The dimensioning of the cross-section of cooling bar 10, of support 14, and of base 3 of the guiding rail is chosen such that a largely uniform pressure contact is achieved over the entire effective length when clamp screws 13 are tightened. As a result, there is a high heat transfer from heated base area 5 of the guiding rail to cooling bar 10. Each of cooling channels 11, 12 in the cooling bar is connected at one bar end to a respective connection 15, 16, via which a coolant, preferably a cooling liquid, is introduced into the longitudinal cooling channels. In order to obtain a continuous circulation, the cooling channels in the cooling bar are connected to each other by a transverse channel or the like.

Figure 1A:
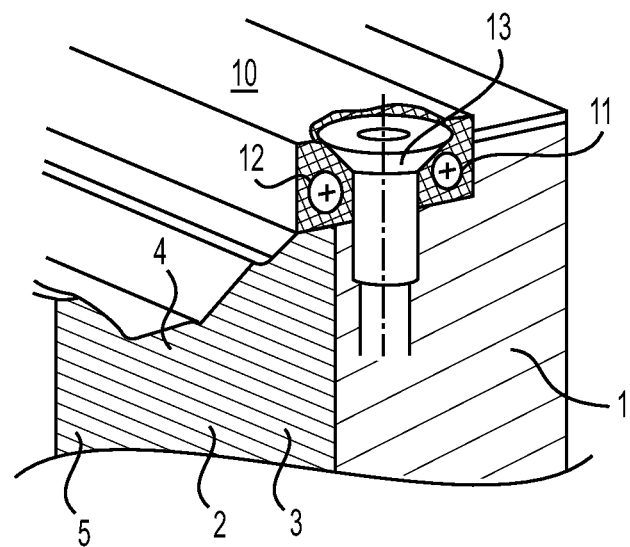
FIG. 1A shows a first embodiment of the guiding system according to the invention in a partially cut perspective view.
Figure 2B:
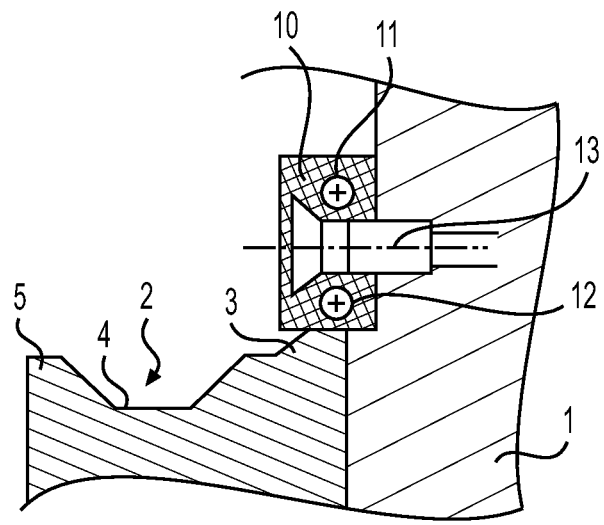
FIG. 2B is a cross-sectional view of the embodiment of FIG. 2A.
Figure 3B:
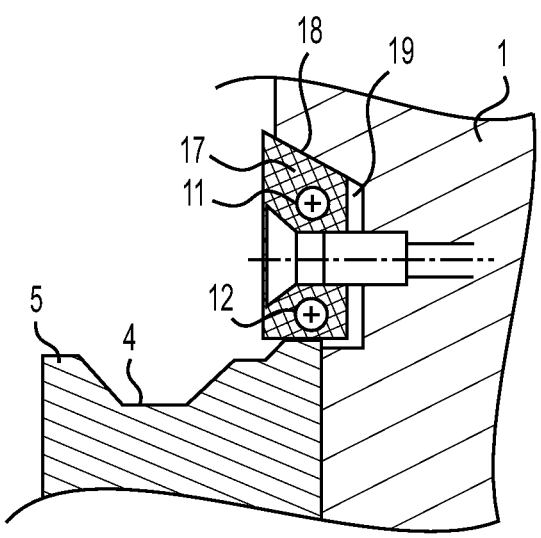
FIG. 3B is a cross-sectional view of the embodiment of FIG. 3A.

As shown in FIGS. 1-3, cooling bars 10 can be positioned differently. For example, the cooling bar of the embodiment according to FIG. 1 rests in horizontally flat fashion on machine part 1 and is clamped in clearance-free manner in support 14 thereof, while in FIG. 2 it adopts a vertical position 90° rotated compared with FIG. 1. In the embodiment according to FIG. 3, the also vertically positioned cooling bar 10 has an upper, angular face 17, which has a wedge-type effect and cooperates with a correspondingly inclined angular face 18, in a recess in machine part 1. In order to obtain an intense clamping action, the cooling bar, which is wedge-shaped in the FIG. 3 embodiment, is spaced apart with respect to the bottom of recess 19, thereby forming a gap.

In all of the above described embodiments, cooling bar 10 has the function of a lateral lock of the respectively assigned guiding rails 2 and additionally has the effect of intense cooling not only of the base area of the associated guiding rail but also of the adjacent area of the machine part so as to reduce the heat transfer from the machine part to the guiding rail, in particular to head 5 of the guiding rail.

In order to ensure the aspired high cooling effects, the guiding rails are preferably made of highly heat-conductive materials. As to the processing properties and the thermal conductivity, continuous casting profiles made of light metals, in particular aluminum or alloys thereof, are particularly suitable when the longitudinal channels 11, 12 can virtually be shaped without additional work during pressing.

The invention is not limited to the embodiments as shown. For example, it is possible to provide, instead of cooling and clamping bars which are continuous in the longitudinal direction of the guiding rail, only relatively short cooling and clamping bars, preferably in the particularly thermal longitudinal sections of the guiding rails.

What is claimed is:

1. A guiding system for a machine tool, the machine tool having a first machine part and a second machine part, the system comprising:
   an elongated guiding rail secured to the first machine part, said guiding rail having a base part;
   a guiding shoe on the second machine part and engaging said guiding rail, said guiding shoe being shaped and configured to be linearly movable along said guiding rail so that the second machine part is movable with respect to the first machine part:
   at least one elongated cooling bar mounted to the first machine part to maintain pressure on at least a portion of the length of said base part of said guiding rail; and
   means for applying a coolant to said cooling bar.

2. The guiding system according to claim 1, wherein said at least one cooling bar has at least one longitudinal channel with intake and discharge connections for the coolant.

3. The guiding system according to claim 2, wherein said cooling bar has a longitudinal channel in each of two spaced lateral areas, a central area between said lateral areas being configured to accommodate fixing elements for fixing said cooling bar to the first machine part.

4. The guiding system according to claim 3, wherein said two longitudinal channels communicate with each other at one end and said intake and discharge connections are jointly provided at the other end of said cooling bar.

5. The guiding system according to claim 4, wherein said cooling bar is held to the first machine part by wedge-type clamping and by clamp screws in lateral pressure contact at one side of said base part of said guiding rail.

6. The guiding system of claim 4, wherein said cooling bar is a continuous casting profile formed of a thermally conductive material, wherein the thermally conductive material is selected from aluminum and aluminum alloys.

7. The guiding system according to claim 3, wherein said cooling bar is held to the first machine part by wedge-type clamping and by clamp screws in lateral pressure contact at one side of said base part of said guiding rail.

8. The guiding system according to claim 3, wherein:
   said first machine part is formed with a flat, linearly continuous countersink; and
   said guiding rail is formed with a widened base part configured to fit into said countersink in the first machine part.

9. The guiding system according to claim 3, wherein said cooling bar is attached as a longitudinally extending support to the first machine part by clamp screws spaced apart from one another in the longitudinal direction and exert a lateral pressure on said base part of said guiding rail.

10. The guiding system of claim 3, wherein said cooling bar is a continuous casting profile formed of a thermally conductive material, wherein the thermally conductive material is selected from aluminum and aluminum alloys.

11. The guiding system according to claim 2, wherein said cooling bar is held to the first machine part by wedge-type clamping and by clamp screws in lateral pressure contact at one side of said base part of said guiding rail.

12. The guiding system according to claim 1, wherein said cooling bar is held to the first machine part by wedge-type clamping and by clamp screws in lateral pressure contact at one side of said base part of said guiding rail.

13. The guiding system according to claim 12, wherein:
- said first machine part is formed with a flat, linearly continuous countersink; and
- said guiding rail is formed with a widened base part configured to fit into said countersink in the first machine part.

14. The guiding system according to claim 12, wherein said cooling bar is attached as a longitudinally extending support to the first machine part by clamp screws spaced apart from one another in the longitudinal direction and exert a lateral pressure on said base part of said guiding rail.

15. The guiding system according to claim 1, wherein:
- said first machine part is formed with a flat, linearly continuous countersink; and
- said guiding rail is formed with a widened base part configured to fit into said countersink in the first machine part.

16. The guiding system according to claim 15, wherein said cooling bar is attached as a longitudinally extending support to the first machine part by clamp screws spaced apart from one another in the longitudinal direction and exert a lateral pressure on said base part of said guiding rail.

17. The guiding system according to claim 1, wherein said cooling bar is attached as a longitudinally extending support to the first machine part by clamp screws spaced apart from one another in the longitudinal direction and exert a lateral pressure on said base part of said guiding rail.

18. The guiding system of claim 17, wherein said cooling bar is a continuous casting profile formed of a thermally conductive material, wherein the thermally conductive material is selected from aluminum and aluminum alloys.

19. The guiding system according to claim 1, wherein said cooling bar is a continuous casting profile formed of a thermally conductive material.

20. The guiding system of claim 19, wherein the thermally conductive material is selected from aluminum and aluminum alloys.

* * * * *